(12) United States Patent
Ziegenfuss

(10) Patent No.: US 7,919,928 B2
(45) Date of Patent: Apr. 5, 2011

(54) BOOST LED DRIVER NOT USING OUTPUT CAPACITOR AND BLOCKING DIODE

(75) Inventor: Mark Ziegenfuss, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 353 days.

(21) Appl. No.: 12/115,471

(22) Filed: May 5, 2008

(65) Prior Publication Data
US 2009/0273290 A1    Nov. 5, 2009

(51) Int. Cl.
*H05B 37/00* (2006.01)
(52) U.S. Cl. ............... 315/227 R; 315/246; 315/307
(58) Field of Classification Search ......... 315/209 R, 315/210, 224, 227 R, 246, 247, 291, 307, 315/308
See application file for complete search history.

(56) References Cited

U.S. PATENT DOCUMENTS

| | | | |
|---|---|---|---|
| 6,285,139 B1* | 9/2001 | Ghanem | 315/291 |
| 7,122,971 B2* | 10/2006 | Yeh et al. | 315/185 R |
| 7,550,934 B1* | 6/2009 | Deng et al. | 315/308 |
| 7,671,575 B1* | 3/2010 | Suzuki et al. | 323/285 |

* cited by examiner

*Primary Examiner* — Thuy Vinh Tran
(74) *Attorney, Agent, or Firm* — Patent Law Group LLP

(57) ABSTRACT

An LED driver is disclosed that boosts an input voltage to drive any number of LEDs in series. The driver includes a switch-mode current regulator that supplies regulated current pulses to the LEDs. No high voltage output capacitor is used to smooth the current pulses, so the LEDs are turned on any off at the switching frequency. Also, no blocking diode between the switching transistor and the LEDs is used. The cathode of the "bottom" LED in the string is connected to ground via a current sense resistor. In parallel with the sense resistor is connected an RC filter using a small, low voltage filter capacitor. The RC filter provides a substantially smooth feedback voltage for the current regulator to control the duty cycle of the switching transistor so that the feedback voltage matches a reference voltage.

20 Claims, 3 Drawing Sheets

FIG. 3A CLOCK ←T→

FIG. 3B GATE DRIVE  D=Ton/T
←Ton→ ←Toff→

FIG. 3C INDUCTOR L1 CURRENT
PEAK SET BY VCONTROL

FIG. 3D SWITCH Q1 CURRENT
PEAK SET BY VCONTROL

FIG. 3E LED CURRENT
PEAK SET BY VCONTROL
I LED Pk
I LED ave

FIG. 3F ILED*Rsense
$V_{fb}$

FIG. 3G $V_{fb}$
Vref

BOOST LED DRIVER NOT USING OUTPUT CAPACITOR AND BLOCKING DIODE

FIELD OF THE INVENTION

This invention relates to light emitting diode (LED) drivers and, in particular, to LED drivers that boost an input voltage to drive LEDs connected in series.

BACKGROUND

LEDs are rapidly replacing incandescent bulbs, fluorescent bulbs, and other types of light sources due to their efficiency, small size, high reliability, and selectable color emission. A typical forward voltage drop for a high power LED is about 3-4 volts. The brightness of an LED is controlled by the current through the LED, which ranges from a few milliamps to an amp or more, depending on the type of LED. For this reason, LED drivers typically include some means to control the LED current.

In applications where high brightness is needed, multiple LEDs are used. It is common to connect LEDs in series, since the current through all the LEDs in series will be the same. The voltage needed to drive LEDs in series needs to be greater than the LEDs' combined forward voltages. For batteries or other power supplies that deliver 12 volts, only three or four LEDs can be connected in series. Therefore, boost converters are typically used in LED drivers that convert a low input voltage into a much higher voltage (e.g., up to 100 volts) to drive a selectable number of LEDs in series.

FIG. 1 is a typical prior art LED driver 10 that drives multiple LEDs 14 in series. Most components of the driver 10 are formed on an integrated circuit chip 12. Since the same chip 12 is used in one embodiment of the present invention, the operation of the driver 10 will be described in detail.

The driver 10 is a DC boost regulator that up-converts an input voltage (Vin) to the required output voltage (Vout) needed to drive the series-connected LEDs 14 at a desired regulated current. The regulator switches a switching transistor Q1 at a certain pulse-width modulation (PWM) duty cycle to maintain Vout at the required level. The switching is at a high frequency, such as 100 KHz-5 MHz, to keep component sizes small.

When the switching transistor Q1 is on, essentially connecting the inductor L1 between Vin and ground, a ramping current flows through the inductor L1, and the blocking diode D1 is off. Stored charge in the output capacitor Cout supplies a smooth current through the LEDs during this time. The blocking diode D1 prevents the capacitor Cout from discharging to ground when the transistor Q1 is on.

When transistor Q1 is turned off, the polarity of the voltage at the anode of diode D1 reverses, and diode D1 turns on. The stored inductor energy is then discharged, as a ramping down current, to recharge the capacitor Cout, while a smooth current flows through the LEDs. The relatively large value of the capacitor Cout maintains Vout at a relatively constant level (i.e., low ripple) to provide a smooth regulated current through the LEDs.

The duty cycle needed to maintain Vout (and thus the current) at the required level to drive the LEDs is set as follows. A low value resistor R1 in series with the LEDs has a voltage drop equal to $I_{LED}*R1$. This voltage drop is a feedback voltage (Vfb) into the controller. An error amplifier 16 (an op amp) receives Vfb and a reference voltage (Vref) and generates an error signal related to the difference between Vfb and Vref. Any difference between Vfb and Vref causes the error signal to correspondingly charge or discharge a compensation capacitor Ccomp, through a compensation resistor Rcomp. The resulting voltage (Vcontrol) at the output of the amplifier 16 is relatively stable. The magnitude of Vcontrol is directly related to the duty cycle of the boost regulator, and the duty cycle is that required to cause Vfb to equal Vref (i.e., zero error signal).

A low value resistor R2 is connected in series with the switching transistor Q1 so that, when Q1 is on and conducting a ramping current through the inductor L1, the R2 voltage drop is a rising ramped voltage. This rising voltage is amplified, as required, by an amplifier 20 and applied to one input of a PWM comparator 22. The comparator's 22 other input is Vcontrol.

A clock is connected to the set input of an RS flip-flop 24 to set the Q output at the beginning of each clock cycle. The clock has a typical frequency between 100 KHz and 5 MHz. The high output of the flip-flop 24 at the start of the cycle is amplified by an amplifier 25, if necessary, to turn on the switching transistor Q1, shown as an N-channel MOSFET. The transistor can be any suitable type. The output of the comparator 22 is connected to the reset input of the flip-flop 24. When the rising voltage crosses Vcontrol, the output of the comparator 22 goes high and causes the Q output of the flip-flop 24 to be reset to zero to turn off the transistor Q1.

In this way, the duty cycle of the switching transistor Q1 is controlled to generate a smooth current through the LEDs required to cause Vfb to equal Vref. The value of resistor R1 can be selected to achieve any desired regulated current.

Numerous other types of boost regulators can also be used.

Common features in typical boost regulators used for driving LEDs in series are the blocking diode D1 and large, high voltage output capacitor Cout. The capacitor Cout must have a high voltage rating, such as 100 v, to handle the boosted voltage and any voltage spikes. Additionally, the value of the capacitor Cout is typically in the range of 1-10 µF so that there is only a small Vout ripple. When driving LEDs, a small variation in the driving voltage may cause a large variation in the current through the LEDs, making the brightness hard to accurately control. Such high value HV capacitors require a relatively large amount of space and are expensive.

Additionally, the blocking diode D1 is typically external to the controller IC chip 12 and must be purchased separately by the user and connected to the controller. Such an external diode and its connection add cost and uses space.

What is desired is a boost LED driver that is smaller and less expensive than the typically LED driver, such as shown in FIG. 1.

SUMMARY

An LED driver is disclosed that boosts an input voltage to drive any number of LEDs in series. A blocking diode and output capacitor are not used, so that the resulting driver may be made smaller and less expensively than prior art drivers.

A boost regulator switches a transistor on and off at a high frequency duty cycle. The transistor connects one end of an inductor to ground when the transistor is on, as with prior art boost converters, to energize the inductor for each cycle. The node of the switching transistor and inductor is directly connected to an anode of the "top" LED in the series string of LEDs. When the switching transistor is turned off, the charged inductor supplies current through the LEDs. There is no blocking diode or output capacitor, so the current through the LEDs is pulsed rather than constant. The cathode of the "bottom" LED in the string is connected to ground via a low value sense resistor. In parallel with the sense resistor is connected a filter resistor and filter capacitor, forming an RC filter. The filter capacitor provides a feedback voltage for the boost regulator. The filter capacitor smoothes the pulsing voltage at the sense resistor generated by the pulsed current through the LEDs when the switching transistor is turned off. Therefore, the feedback voltage is relatively stable over the entire switching cycle. The filter resistor is a relatively high value resistor for preventing the filter capacitor from discharging through the sense resistor when the switching transistor is on and the LEDs are off.

Since the filter capacitor is connected to the bottom LED (the bottom LED only sees a low voltage) and the value of the sense resistor is relatively low (e.g., less than 10 ohms), the filter capacitor can be a low voltage ceramic type, such as a 6 volt capacitor. Further, since the filter resistor has a high value, the RC time constant is large, even with a small value filter capacitor (e.g., 0.1 µF). Therefore, the feedback voltage can be very stable with a small, low voltage filter capacitor.

The resulting LED driver can be made very small and inexpensively.

Although the LEDs are turned on and off at the HF switching rate of the switching transistor, such flicker is not noticeable to the human eye. To achieve the desired brightness, the user sets the average current through the LEDs. The average current may be set by the value of the sense resistor or by adjusting the values of other components or the error amplifier reference voltage.

Additionally, a PWM brightness control circuit can effectively enable and disable the driver at a relatively low frequency duty cycle, such as 100 Hz-1000 Hz, to dynamically control the average current through the LEDs.

Virtually any type of boost controller may be used in conjunction with the novel feedback circuit of the present invention, such as the boost controller of prior art FIG. 1.

BRIEF DESCRIPTION OF THE DRAWINGS

FIGS. 3A-3G are examples of various voltage and current waveforms produced by the LED driver of FIG. 2.

Elements in the various figures labeled with the same numerals are the same or equivalent.

DETAILED DESCRIPTION

Figure 1:
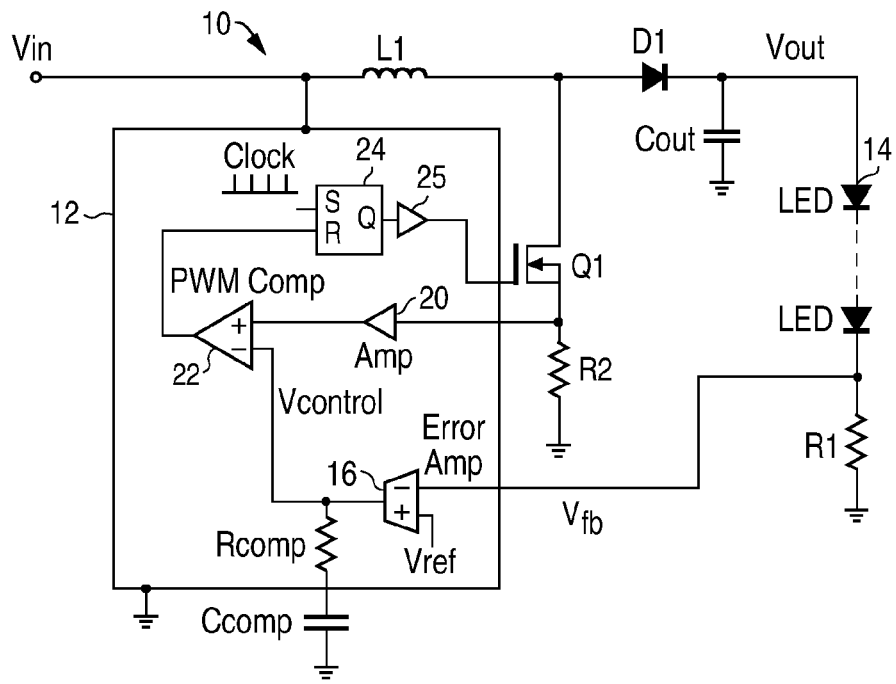
FIG. 1 illustrates a typical LED driver for driving a number of LEDs in series.
Figure 2:
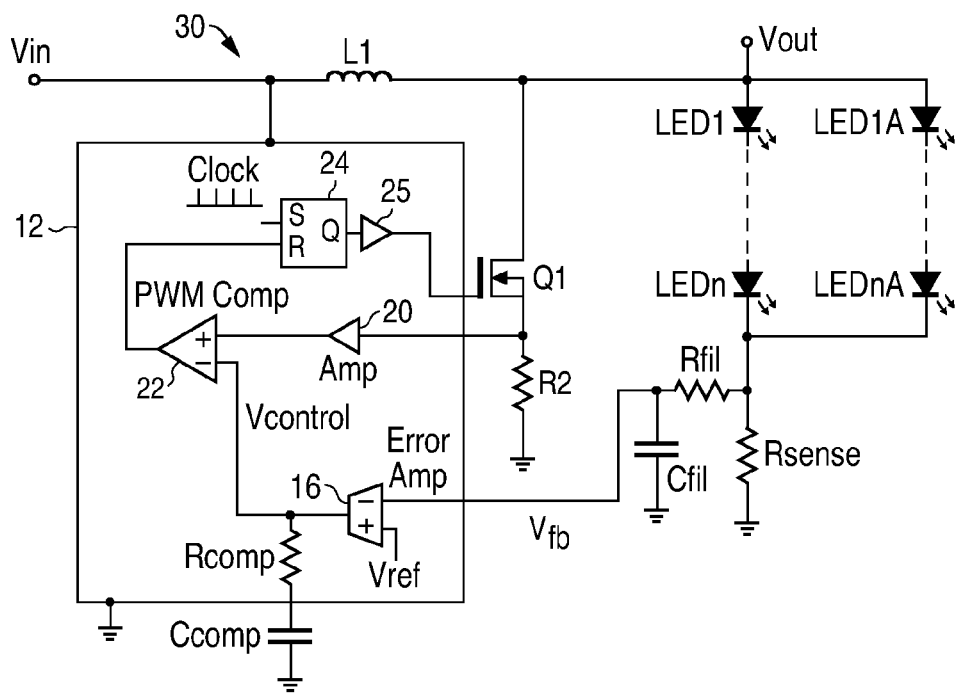
FIG. 2 illustrates an LED driver in accordance with one embodiment of the present invention.

FIG. 2 illustrates one embodiment of the inventive LED driver 30. The boost controller portion formed on the integrated circuit chip 12 may be the same as in FIG. 1 and will not be described again in detail.

The driver 30 is shown driving two parallel strings of LEDs (LED1 through LEDn and LED1A through LEDnA). Any number of LEDs may be connected in series, and any number of strings may be connected in parallel. As the number of LEDs in series increases, the driver 30 automatically increases its boosted output voltage to supply a predetermined average current through the LEDs, where the average current is set by the value of one or more components of the driver 30.

The boost controller on chip 12 turns the switching transistor Q1 on and off at a frequency determined by the clock supplying set pulses to the RS flip-flop 24. The frequency will typically be 1 MHz-3 MHz. The duty cycle of the transistor Q1 is controlled by the magnitude of the Vcontrol signal, which is that voltage needed to keep the feedback voltage Vfb into the error amplifier 16 equal to the reference voltage Vref. In one embodiment, Vref is a fixed voltage between 0.2 and 2 volts.

The operation of the circuit of FIG. 2 will be described with reference to the example waveforms of FIGS. 3A-3G.

When a clock pulse (FIG. 3A) is received by the RS flip-flop 24, the flip-flop 24 turns the switching transistor Q1 on (FIG. 3B), and a ramping current is conducted by the inductor L1 (FIG. 3C) through the transistor Q1 (FIG. 3D) and the resistor R2. At this time, no current flows through the LEDs (FIG. 3E) since Vout is close to ground.

Eventually, the ramping current through the resistor R2 causes the ramping voltage input into the PWM comparator 22 to cross the Vcontrol signal. At this point in the cycle, the PWM comparator 22 triggers to reset the flip-flop 24 to turn off the transistor Q1. This triggering time in the cycle sets the instantaneous peak current through the inductor L1 and the transistor Q1 (FIGS. 3C and 3D). The voltage at the inductor L1 then reverses polarity and exceeds the combined forward voltages of the LEDs to turn them on. Because the ramping current through the transistor Q1 is used to trigger the comparator 22, the regulator is called a current mode regulator.

The LED current (FIG. 3E), provided by the inductor L1, ramps down until the beginning of the next clock cycle. During this time, the LEDs are emitting light, and the perceived brightness corresponds to the average current through the LEDs (FIG. 3E). The average current may be set by the user by selecting a value of the current sense resistor Rsense connected in series with the LEDs, through which the LED current flows. A lower value of Rsense will raise Vcontrol to increase the duty cycle to create a higher peak current and a higher average current. The pulsing and ramping voltage drop across the Rsense, equal to ILED*Rsense (FIG. 3F), is filtered by the combination of the filter resistor Rfil and filter capacitor Cfil to create a relatively stable feedback voltage Vfb (FIG. 3F). The RC filter circuit has a high time constant due to Rfil having a high value, such as 500 ohms. Rfil may have a rating of 1/10 watt.

Additionally, a PWM brightness control circuit (not shown), receiving an externally generated brightness control signal, can effectively enable and disable the driver 30 at a relatively low frequency duty cycle, such as 100 Hz-1000 Hz, to dynamically control the average current through the LEDs.

FIG. 3G illustrates the Vfb and Vref inputs into the error amplifier 16. Increasing the RC time constant reduces the Vfb ripple. The feedback aspect of the boost regulator varies the duty cycle to keep Vfb approximately matched to Vref.

In one example, assume the driver 30 is to power 10 LEDs in series with an average current of 40 mA, at an efficiency (eff) of 85%, and Vin is 12 volts. If the voltage drop across each LED is 3 volts, then Vout must be approximately 30 volts, ignoring the voltage drop across the sense resistor Rsense. The duty cycle (D) of the switching transistor Q1 equals [Vout−(Vin*eff)]/Vout, which equals 0.66. The average LED current (40 mA) approximately equals their peak current multiplied by the ratio of their on-time vs. cycle time (ignoring the current ramping), which is Iavg=Ipk*(1−D). Therefore, the LED peak current is 40 mA/0.34, or 118 mA.

The voltage levels at Rsense are low since the LEDs have dropped the high voltage Vout down to typically less than 2 volts. Therefore, the filter capacitor Cfil can be an inexpensive low voltage ceramic type. The breakdown voltage of the filter capacitor Cfil may be about 6 volts, and its value may be on the order of 0.1 µF.

Unlike the prior art LED driver of FIG. 1, the LEDs in FIG. 2 are not driven by a constant Vout, smoothed by a large, high voltage capacitor. Rather, in FIG. 2, the LEDs are driven by a high frequency pulsed current, and the low voltage feedback voltage is smoothed by a small, low voltage capacitor Cfil and resistor Rfil. The capacitor Cfil may be one-tenth the size of the typical output capacitor used in prior art LED drivers. The driver components in FIGS. 1 and 2 may be selected so that the perceived brightness of the LEDs are identical, but the driver of FIG. 2 will be inherently smaller and less expensive due the use of a smaller capacitor and no blocking diode.

Figure 4:
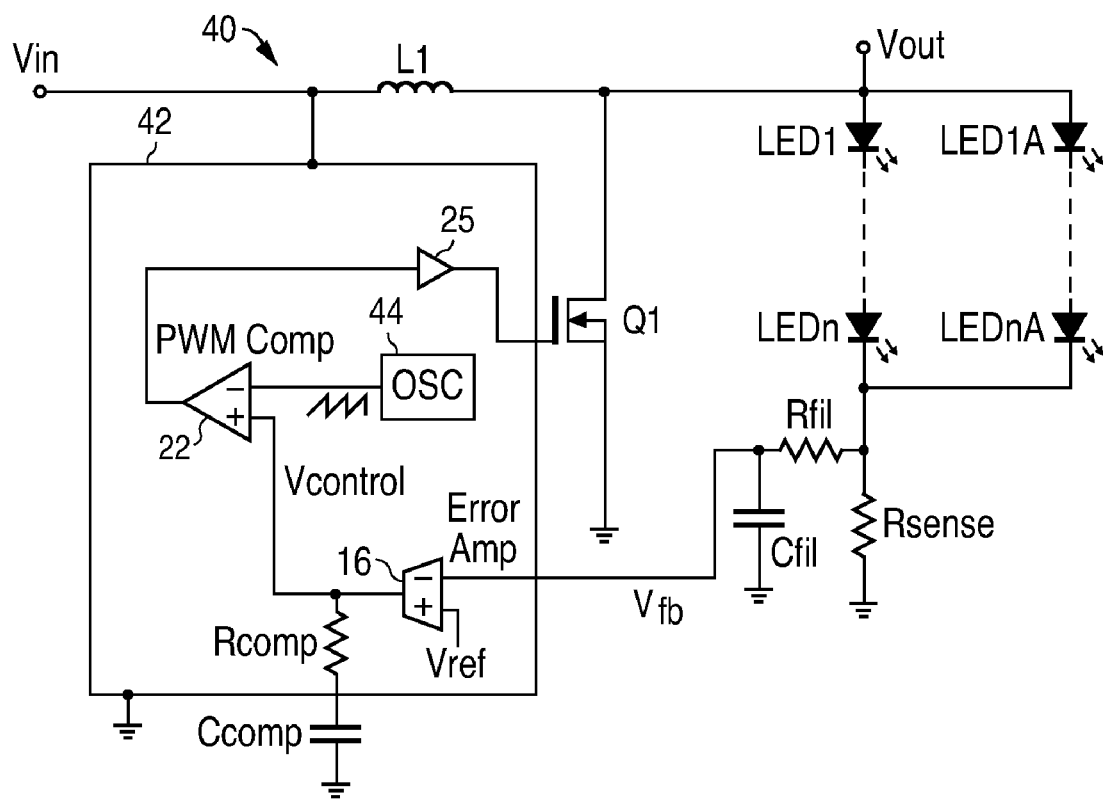
FIG. 4 illustrates an LED driver similar to FIG. 2 but with a voltage mode boost regulator controller, in accordance with another embodiment of the invention.

Many different boost controller circuits, including voltage mode types, can be used instead of the current mode circuit shown in FIG. 2. FIG. 4 illustrates an example of an LED driver 40 using a conventional voltage mode boost controller chip 42, but in conjunction with the inventive feedback circuit. The PWM comparator 22 compares Vcontrol to a sawtooth waveform generated by an oscillator 44. No separate clock or flip-flop is used. At the start of the cycle, Vcontrol is greater than the sawtooth signal, and the comparator 22 applies a high gate voltage to the transistor Q1 to turn it on. When the sawtooth signal crosses Vcontrol, the comparator 22 triggers to turn the transistor Q1 off. The remainder of the operation is identical to that of FIG. 2.

Many other types of boost controllers may be used in conjunction with the invention.

The various components may be coupled together by direct wiring, or via resistors, or via buffers, or via level shifters, or via inverters, or via other components in order to properly operate. The polarities of any comparator and op amp inputs may be the opposite with suitable changes in any affected circuits.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A light emitting diode (LED) driver for driving a plurality of LEDs connected in series, the driver comprising:
    a current regulator configured to boost an input voltage to drive the plurality of LEDs with a boosted output voltage, the current regulator comprising:
        a feedback circuit comprising a first resistor and first capacitor connected in series, a first terminal of the first resistor being connected to receive a signal corresponding to a pulsed current through the plurality of LEDs, a second terminal of the first resistor being connected to a first terminal of the first capacitor, the first terminal of the capacitor providing a feedback voltage;
        an error amplifier having inputs comprising the feedback voltage and a reference voltage, an output of the error amplifier determining a control voltage;
        a switching transistor connected to be switched at a duty cycle corresponding to a magnitude of the control voltage, the duty cycle corresponding to a peak current generated by the current regulator;
        an inductor connected to a first terminal of the switching transistor and to the input voltage for providing a varying current as the switching transistor is turned on and off; and
        a first terminal of the switching transistor being connected to an anode of an LED in the plurality of LEDs connected in series, with no smoothing capacitor connected to the anode, such that pulses of current are conducted through the LEDs as the switching transistor turns on and off,
    wherein a magnitude of the feedback voltage from the first capacitor is controlled by the current regulator to be approximately equal to the reference voltage by the current regulator controlling the duty cycle of the switching transistor.

2. The driver of claim 1 wherein a second terminal of the first capacitor is connected to ground.

3. The driver of claim 1 wherein the first terminal of the switching transistor is directly connected to the anode of the LED in the plurality of LEDs with no blocking diode connected in-between.

4. The driver of claim 1 further comprising a sense resistor coupled in series with the plurality of LEDs, wherein a voltage drop across the sense resistor provides the signal corresponding to the current through the plurality of LEDs.

5. The driver of claim 1 further comprising a PWM comparator having inputs being the output of the error amplifier and an output of a waveform generator, the waveform generator generating a ramping signal, an output signal of the PWM comparator controlling switching of the switching transistor.

6. The driver of claim 5 wherein the waveform generator comprises a resistive device in series with the switching transistor, wherein a voltage at the resistive device provides the ramping signal as current through the switching transistor ramps.

7. The driver of claim 5 wherein the waveform generator comprises an oscillator generating a sawtooth waveform.

8. The driver of claim 1 further comprising the plurality of LEDs connected to the first terminal of the switching transistor.

9. The driver of claim 1 wherein the first capacitor has a voltage rating that is lower than the boosted output voltage.

10. A method performed by a light emitting diode (LED) driver for driving a plurality of LEDs connected in series, the method comprising:
    regulating current through the plurality of LEDs, regulating the current comprising boosting an input voltage applied to the driver to drive the plurality of LEDs with a boosted output voltage, regulating the current further comprising:
        generating a pulsed current sense voltage corresponding to pulsed current through the plurality of LEDs;
        filtering the current sense voltage to generate a feedback signal; and
        controlling a duty cycle of a switching transistor to regulate current through the plurality of LEDs so that the feedback voltage approximately matches a reference voltage,
    wherein when the switching transistor is off, a pulse of current flows through the plurality of LEDs and, when the switching transistor is on, no current flows through the LEDs.

11. The method of claim 10 wherein a first terminal of the switching transistor is connected to an anode of an LED in the plurality of LEDs, with no smoothing capacitor connected to the anode, such that pulses of current are conducted through the LEDs as the switching transistor turns on and off.

12. The method of claim 10 further comprising:
    charging an inductor, connected between the input voltage and an anode of an LED in the plurality of LEDs, when the switching transistor is on, wherein no current is supplied to the plurality of LEDs when the switching transistor is on; and discharging the inductor to supply a pulse of current through the plurality of LEDs when the switching transistor is off.

13. The method of claim 10 wherein filtering the current sense voltage to generate a feedback signal comprises applying the pulsed current sense voltage to a filter capacitor through a resistor.

14. The method of claim 10 wherein generating a pulsed current sense voltage corresponding to the current through the plurality of LEDs comprises detecting a voltage drop across a sense resistor coupled in series with the plurality of LEDs.

15. The method of claim 14 wherein filtering the current sense voltage to generate a feedback signal comprises applying the pulsed current sense voltage to a filter capacitor through a filter resistor, wherein the filter resistor is connected to the sense resistor, and the capacitor is connected to ground.

16. The method of claim 15 wherein the capacitor has a voltage rating that is lower than the boosted output voltage.

17. The method of claim 10 wherein a first terminal of the switching transistor is directly connected to an anode of an LED in the plurality of LEDs connected in series with no blocking diode connected in-between.

18. The method of claim 10 wherein controlling the duty cycle of the switching transistor comprises:
   applying the feedback signal and the reference voltage to inputs of an error amplifier; and
   comparing, by a PWM comparator, a control signal, set by an output of the error amplifier, to a ramping output signal of a waveform generator, an output signal of the PWM comparator controlling switching of the switching transistor to cause the feedback signal to approximately match the reference voltage.

19. The method of claim 18 wherein the waveform generator comprises a resistive device in series with the switching transistor, wherein a voltage at the resistive device provides the ramping output signal as current through the switching transistor ramps.

20. The method of claim 18 wherein the waveform generator comprises an oscillator generating a sawtooth waveform.

* * * * *